April 29, 1969  H. H. SCHMIDGALL  3,440,792
COMBINATION STIRRUP AND SPACER FOR RE-ENFORCED CONCRETE
PIPE AND LIKE STRUCTURE
Filed Oct. 20, 1967
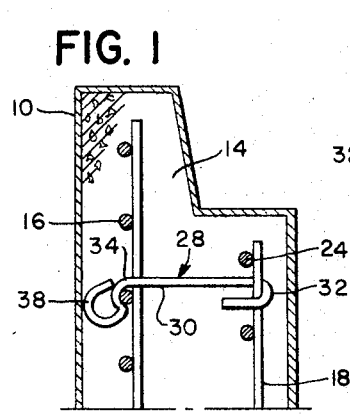
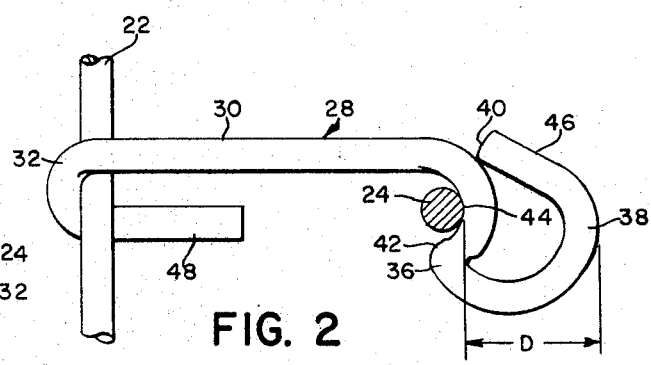
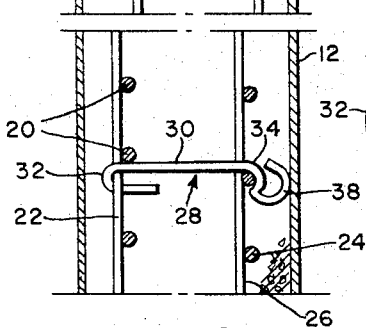
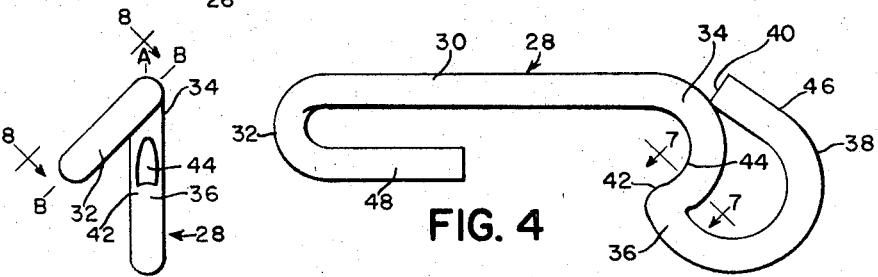
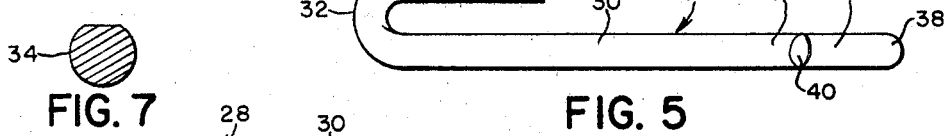
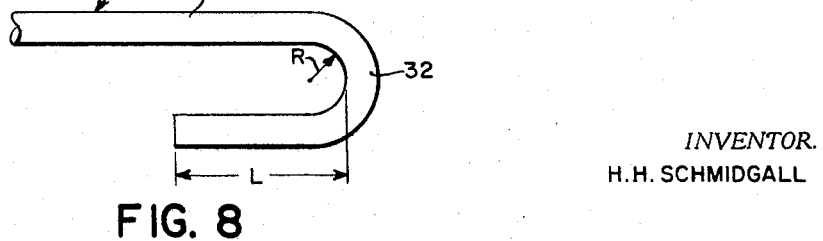
*INVENTOR.*
H. H. SCHMIDGALL

United States Patent Office 3,440,792
Patented Apr. 29, 1969

3,440,792
COMBINATION STIRRUP AND SPACER FOR RE-ENFORCED CONCRETE PIPE AND LIKE STRUCTURE
Hartzell H. Schmidgall, Mediapolis, Iowa 52637
Filed Oct. 20, 1967, Ser. No. 676,964
Int. Cl. E04c 5/16; E04h 12/06, 12/12
U.S. Cl. 52—687                              5 Claims

ABSTRACT OF THE DISCLOSURE

A combination spacer and stirrup for use in interconnecting the re-enforcing mesh or case wires embedded in concrete structures such as cast pipe etc., featuring a rod-like member having reversely bent hooks at opposite ends facing each other and constructed to be easily installed and to maintain wire-engaging relationship without accidental dislodgement during processing of the concrete, the hooks having novel configurations, one being in the form of a J and the other in the form of a C and the latter having an extension loop serving as a spacer for properly spacing the adjacent form wall from the adjacent mesh or wire.

Background of the invention

In the manufacture of re-encorced concrete structures such as pipe and the like, it is common practice, for example in cylindrical pipe, to utilize a hollow form having concentric walls into which are initially disposed a pair of concentric mesh cylinders or cage of skeletal construction. Since these meshes are separately installed, it is necessary to tie them together to prevent radial separation and it is also necessary to space them radially from the inner and outer walls of the form so that they are properly located to become embedded in the finished pipe. Spacer hooks and wires are generally known, but these have several disadvantages, among which are lack of adequate strength, inability to retain their position during installation of the forms, liability to crushing of the spacer portion and thus loss of proper spacing of the mesh from the form walls, and failure under radial forces applied to the finished product etc.

Summary of the invention

The present invention provides a novel and improved element having specially configured J and C hooks, the latter being continued as a closed loop that withstands crushing forces and the former having an extra long leg parallel to the main body of the member so as to provide better anchorage and to prevent accidental unhooking, whether used as a spacer or as a stirrup. Moreover, the combined C hook and closed loop includes specially configured surfaces enabling easy installation of the member in association with re-enforcing mesh and providing desirable guide surfaces so that slipping of the form over the assembled cage and members is facilitated and the forms do not become hung up on the spacer portions. Further, the inner part of the C hook has a detent notch that positively locks the member to its mesh wire. A further feature is that the planes of the J and C hooks are angled with respect to each other so that the member can span either a pair of parallel mesh wires or a pair of mesh wires that are in crossing relationship.

Description of the drawings

FIG. 1 is a fragmentary sectional view showing the invention as used in a typical concrete wall construction;
FIG. 2 is an enlarged view showing the member as used between a pair of mesh elements in which one wire is vertical and the other horizontal;
FIG. 3 is a similar view showing a stirrup use in which the spaced mesh wires are parallel;
FIG. 4 is an elevation of the member per se;
FIG. 5 is a top view of the member;
FIG. 6 is an end view of the member;
FIG. 7 is an enlarged section on the line 7—7 of FIG. 4; and
FIG. 8 is a fragmentary elevation as seen along the line 8—8 of FIG. 6.

Description of a preferred embodiment

In FIG. 1, showing a typical re-enforced concrete structure still in its form, the inner and outer walls of the form are indicated at 10 and 12, the concrete at 14 and the inner and outer wires, cages or mesh rings at 16 and 18, the inner mesh having a plurality of, said, horizontal wires 20 and vertical wires 22 and the outer mesh having horizontal and vertical wires 24 and 26 respectively. The crossing wires of each mesh are of course welded together, usually in a rectangular skeletal pattern as is known to those versed in the art.

The combination spacer-stirrup member is indicated in its entirety by the numeral 28 and reference will be primarily to FIGS. 4–8 for disclosure of its configuration and component parts.

The member is of steel, rod-like construction, having an elongated straight body 30, an integral J-shaped hook 32 at one end and an integral C-shaped hook 34 at its other end, which is further configured to provide a curved guide extension 36 which is in turn reversely curved as respects the hook 34 to provide a closed loop 38. The hook 34, extension 36, loop 38 and body 30 are intersected by a median plane A—A which is at an angle to a median plane B—B that intersects the J hook 32 and body 30 (FIG. 6). The two planes A—A and B—B intersect on the longitudinal axis of the body 30. The purpose of this construction will be described later, reference here to this feature being had to call attention to the fact that although the radii of the bight of the J hook 32 and of the C hook 34 are substantially the same, this effect may not be readily apparent from FIGS. 1–5, for example, but FIG. 8 shows the true dimension and shape of the J hook.

In use as a spacer (FIG. 1) the members are installed alternately so that the closed loops 38 are staggered at opposite sides of the meshes 16 and 18 so as to serve as radial spacers for the respective form walls 10 and 12. In this instance, the J hook of one member will hook over a vertical wire of one mesh, as the wire 26 of the mesh 18, and the C hook will be hooked over the horizontal wire 20 of the other mesh 16; the member 28 just below it will be reversed, and so on. Thus the loops 38 alternately space the inner and outer form walls from the respective meshes. See also FIG. 2. In a conventional mesh construction, the horizontal wires will be heavier than the vertical wires. For example, the former may be 5⁄16″ and the latter ¼″. The radius of the bights of the J and C hooks are preferably on the order of 5⁄16″ so as to enable the hooks to adapt themselves to a variety of wire sizes and especially to the sizes just noted.

One feature of the member 28 in its spacer use is that the free end of the rod that forms the closed loop 38 abuts the outer part of the C hook 34 in about longitudinal alinement with the axis of the member body 30. This contact is shown at 40. The construction of the closed loop 38 definitely establishes the necessary spacing between the mesh and the associated form wall as measured from the point of tangency between the wire 24 and the inside arc of the C hook to the inner surface of the form wall. This is represented by the dimension D in FIG. 2. Since the loop is closed because of the abutting relationship at 40, the loop cannot be crushed or closed further and thus the dimension D is maintained even though radial forces may be applied through the form walls.

A characteristic of the guide extension 36 of the C hook 34 is that the reversely curved portion provides a smoothly rounded guide surface 42 that enables the C hook to be easily snapped over its mesh wire after the J hook is hooked over its wire, thus facilitating manual installation of the member. Further, in order to improve the ability of the member 28 to retain its position, the inner curved part of the C hook is provided with a detent notch 44, which snaps over the wire 24, for example, and prevents accidental dislodgment of the member, as when it may be struck by the edge of a form wall as the cage is being lowered into place. Accidental dislodgment in an assembly operation in which the form is lowered over the cage is further guarded against because the terminal end of the closed loop is in the form of a ramp 46 so that the edge of a form being lowered is guided outwardly and around the outside of the loop 38 and cannot hang up on the member. This is of course true of both inner and outer form walls, it being understood that conventionally the walls are fixed in spaced apart relationship before receiving the meshes 18 and 16, whether the form be slipped over the meshes or the meshes be inserted into the form.

A feature of the J hook 32 is that it has a free relatively long leg 48, here preferably on the order of about two and one-half to three and one-half times as long as the radius R of the bight of the J hook. It is found that a length of about three times the radius R is acceptable. For example, if R is ⅝″, the length of the leg 48 will be about 1″. Or stated in another manner, the length of the leg 48 may be related to the distance between the point of tangency between the inner surface of the bight of the J and the terminal end of the leg, shown as dimension L in FIG. 8, which is about four times the radius R. This relationship is selected on the basis of the amount of overhang found to be desirable; i.e., the amount of overhang that the leg 48 has relative to a horizontal wire 50 paired with a spaced horizontal wire 52 in the stirrup use of the member (FIG. 3). Although the stirrup arrangement in general is common in the art, it may be well to explain here that in such case a plurality of members such as those indicated here at 28 are used in a localized area with all closed loops 38 directed in the same direction (outwardly), the aim being to prevent separation of the wires 50 and 52 by radial crushing forces applied to the finished pipe. That is to say, if a radial inward force is applied to the pipe in the direction indicated by the arrow F in FIG. 3, the natural tendency is for the wire 50 to pull away from the wire 52, since the wire 50 is adjacent to the interior surface of the pipe and is confronted with a minimum layer of concrete, whereas the wire 52 is embedded in a thickness between the wire 52 and the outer surface of the pipe. Thus, if the wire 50 can be adequately tied to the wire 52, crushing of the pipe can be prevented.

It is in this area that the increased length of the leg 48 of the J hook becomes important, along with its substantially parallelism with the body 30, because it provides a positive hook and eliminates any ramp effect by which the J hook could slide off the wire 50 as the member 28 is placed under heavy tension by crushing forces such as the force F. Even in the spacer use of the member 28 (FIGS. 1 and 2) the length of the leg 48 serves this function, as will be seen when it is considered that a downward force applied, for example, by the form against the ramp 46, will tend to cause the member 28 to rock clockwise about the wire 24 as a fulcrum, but this will be resisted positively by the straight parallel leg 48 so that the member cannot become dislodged. In short, the increased length of the leg 48 functions to prevent dislodgment of the member during form assembly and also increases the anchorage of the member in the finished product.

The angle between the planes A—A and B—B enables the use of the member between crossing wires (FIGS. 1 and 2) and parallel wires (FIG. 3), thus enhancing the versatility of the member for a variety of uses. The radii at R further adapts the member to a variety of wire sizes, yet the dentent notch 44, and particularly the combination thereof with the long leg 48, permits easy installation as the meshes are compressible toward each other while serving as a positive lock against dislodgement of the member as the meshes spring apart. In the finished product, the long leg 48 and the closed loop 38 provides additional member material for improving the anchorage of the member in the concrete. The rod material itself is shown as being on the order of ¼″ when adapted for typical mesh material and construction as illustrated and the related dimensions are formed accordingly. Obviously, these may be varied according to form and pipe sizes.

I claim:

1. An article of the class described, comprising a rod-like member including an elongated straight body, an integral J-shaped hook at one end and an integral combined C-shaped hook and closed loop at its other end, said hooks having substantially the same radius on their curved parts and facing directly toward each other in longitudinally spaced apart relationship, the J-shaped hook having a free straight leg substantially parallel to the body and terminating short of the C-shaped hook, the closed loop extending from an integral junction with the C-shaped hook in the direction opposite to the J-shaped hook as a reversely curved guide extension of smoothly rounded configuration, said extension being further curved back up and toward said C-shaped hook and having a terminal end in substantially abutting relationship to the outer part of said C-shaped hook in approximate horizontal alinement with the body to complete said closed loop.

2. The invention defined in claim 1 in which the inside curved part of the C-shaped hook has a detent notch therein toward the J-shaped hook.

3. The invention defined in claim 1, in which a common median plane cuts the C-shaped hook, the extension, the body and the loop.

4. The invention defined in claim 3, in which the median plane of the J-shaped hook that passes through the body and the free leg is at an angle of between 30°–60° to the aforesaid median plane.

5. The invention defined in claim 1, in which the leg of the J-shaped hook is on the order of about two and one-half to three and one-half times the radius of the curved parts of said hook.

References Cited

UNITED STATES PATENTS

| | | | |
|---|---|---|---|
| 824,594 | 6/1906 | Scofield | 52—687 |
| 918,716 | 4/1909 | Wedmore | 52—687 |
| 1,365,125 | 1/1921 | Schroeder | 52—687 |
| 1,561,323 | 11/1925 | Gregg | 52—687 |
| 1,986,172 | 1/1935 | Wilson | 52—581 X |
| 2,053,487 | 9/1936 | McLellan | 52—650 |

ALFRED C. PERHAM, *Primary Examiner.*

U.S. Cl. X.R.

52—652, 650, 714; 24—81; 138—175